May 19, 1942.   W. LOHS   2,283,746

RACK DRIVE

Filed May 16, 1940

INVENTOR.
Willy Lohs
BY Stephen Cerstvik
ATTORNEY.

Patented May 19, 1942

2,283,746

UNITED STATES PATENT OFFICE 2,283,746

RACK DRIVE

Willy Lohs, Berlin-Siemensstadt, Germany, assignor to Siemens Apparate und Maschinen Gesellschaft mit beschränkter Haftung, Berlin, Germany, a corporation of Germany Application May 16, 1940, Serial No. 335,639
In Germany May 4, 1939

5 Claims. (Cl. 74—422)

The present invention relates to improvements in racks and driving means therefor. More particularly, the invention relates to a rack especially for operating adjusting rods in airplanes, and to multi-stage reduction gearing of a very high speed reducing value for driving said rack.

It is an object of the invention to obtain a rack drive of the above mentioned character which requires considerably less material and space and is of lighter weight than similar devices known heretofore, so as to be especially useful in airplanes, for instance, for operating the adjusting rods of the landing gear and the like.

Another object of the invention is to provide a rack drive of high efficiency and low cost of manufacture which only requires small spur gear wheels.

For attaining these objects, the transmission of the driving force from the driving pinion to the driven rack which is preferably provided with teeth on both sides, is effected according to the invention by several stages or branches of gears so as to drive the rack by means of one or more rows of gear wheels, preferably by two parallel rows mounted on opposite sides of the rack. A further advantage hereby obtained consists in that the entire gear requires no more space in any direction than that required by a hydraulic adjusting drive which may be used in exchange thereof and which may comprise a piston mounted directly on the adjusting rod and movable longitudinally in a compression cylinder.

Further objects, features and advantages of the present invention will appear from the following detailed description and the accompanying drawing, in which Fig. 1 is a diagrammatic front view of one embodiment of the invention, Fig. 2 is a side view thereof, Fig. 3 is a plan view of the embodiment shown in Figs. 1 and 2.

Figure 1:
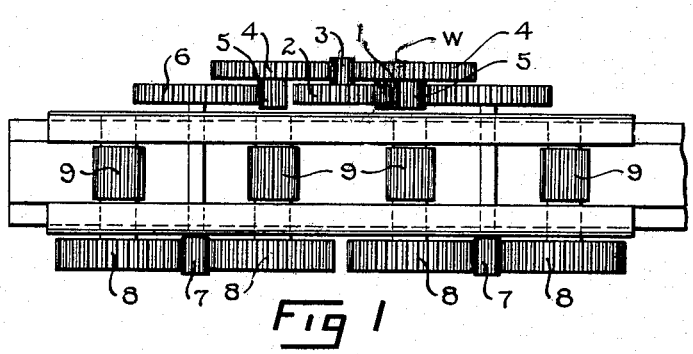
Figure 2:
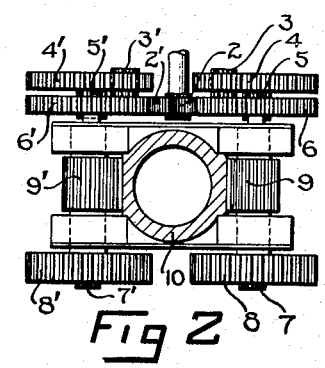
Figure 3:
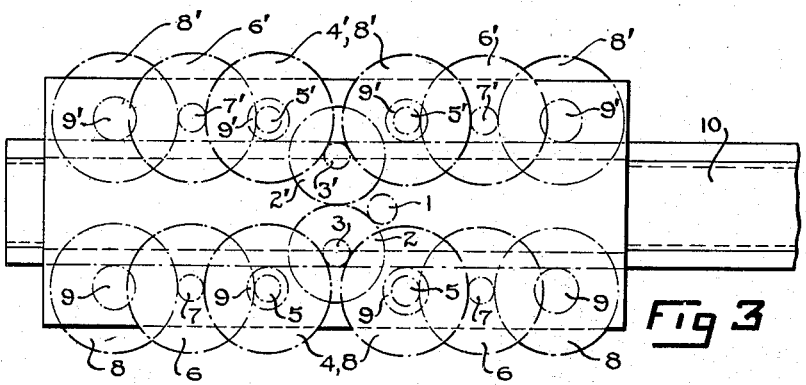

The gear according to Figs. 1 to 3 consists of five stages and is made up as follows: The driving force of the shaft W which may be driven, for example, by an electromotor (not shown), is first transmitted from the driving gear wheel 1 to the wheel 2 of the next following stage and from the wheel 2 to a corresponding second wheel 2' of the same stage for reversing the direction of rotation. The next stage is then driven by the pinions 3 and 3' mounted on common shafts with the wheels 2 and 2', respectively. The pinions 3 and 3' each drive two wheels 4 and 4', respectively, which are connected through pinions 5 and 5' and wheels 6 and 6' with the pinions 7 and 7', respectively. The rotary force is then transmitted by each of the pinions 7 and 7' to two following gear wheels 8 and 8' each having mounted on its shaft a driving pinion 9 or 9', respectively all of which are in engagement with the gear teeth of the rack 10 having gear teeth on both sides thereof. The rack 10 is therefore driven by four wheels 9 engaging one side thereof and four other wheels 9' engaging the other side.

Figure 4:
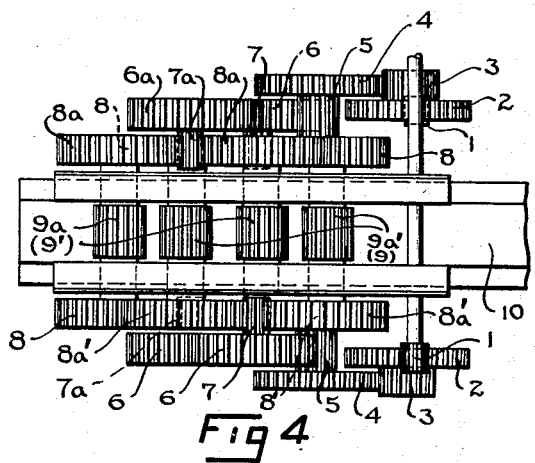
Fig. 4 is a diagrammatic front view of another embodiment of the invention.
Figure 5:
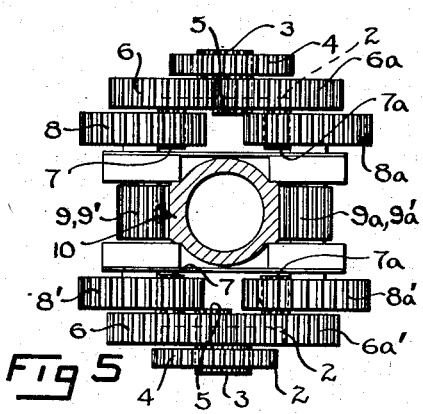
Fig. 5 is a side view thereof.
Figure 6:
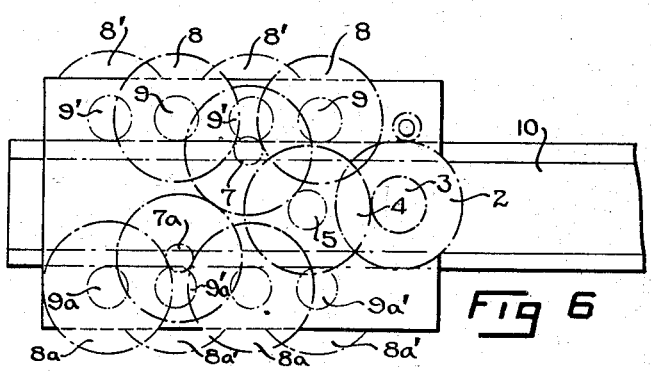
Fig. 6 is a plan view of the embodiment shown in Figs. 4 and 5.
Figure 7:
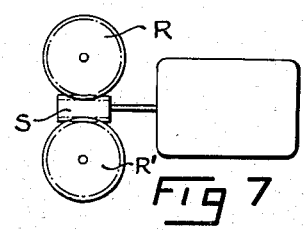
Fig. 7 is a diagrammatic view showing the manner of connecting the gear according to Figs. 4 to 6 to a driving motor.

In the embodiment of the invention shown in Figs. 4 to 6, the rotary force of the motor shaft is transmitted to the rack 10 by a gear consisting of six stages. In the first stage, the shaft of the motor M (Fig. 7) carries a worm wheel S which is in engagement with the worm wheels R and R' the shafts of which each carry a driving pinion 1 or 1', respectively, which are in engagement with the gear wheels 2 and 2', respectively. The next stage is driven by the pinions 3 and 3' mounted on common shafts with the wheels 2 and 2', respectively. The force is then transmitted from the pinions 3 and 3' through the gear wheels 4 and 4' and the pinions 5 and 5' to the gear wheels 6 and 6', respectively. These wheels are, on one side, in driving engagement with the corresponding wheels 6a and 6a', respectively, while on the other side, the rotary force is transmitted through the shafts of the wheels 6 and 6' to the pinions 7 and 7', respectively each of which, in turn, drives two following gear wheels 8 or 8', respectively. Each of these wheels carries on its shaft a driving pinion 9 or 9', respectively, which engage the rack 10. In a corresponding manner, each of the gear wheels 6a and 6a' carries on its shaft a pinion 7a or 7a', respectively, each of which is in driving engagement with two gear wheels 8a and 8a'. Each of these wheels has mounted on its shaft a driving pinion 9a or 9a', respectively, engaging the rack 10. The four pinions 9 and 9' are thus in driving engagement with one side of the rack 10 and the four other pinions 9a and 9a' with the other side thereof.

The embodiment according to the invention as shown in Figs. 4 to 6 also has the advantage that the shaft of the motor M with the worm wheel S thereon may be shiftable to some extent in axial direction relative to the worm wheels R and R' which may be mounted in a separate gear casing together with the gear wheels 1 to 9. The fact that the axis of the motor may be parallel with or even located symmetrically relative to the rack, permits the rack drive including the motor to be arranged very closely to the respective adjusting rod of the airplane. In all embodiments of the invention, the driving force is very equally distributed over the rack 10 and the pitch of the gear teeth may be made very small since the rack does not need to be stronger than necessary for withstanding the tractive forces to be transmitted.

I claim:

1. A rack drive comprising a single driving means, a rack having toothed portions on opposite sides thereof, a reduction mechanism comprising a plurality of rotatable gear means defining a plurality of gear stages, pinions mounted for rotation with each of said gear means so that the pinions of the gear means of the first gear stage engage with a gear means of the next gear stage and the pinions carried by the gear means of the last-named gear stage engage with a gear means of the succeeding gear stage in a manner whereby the gear means of the last gear stage are driven by the pinions of the preceding gear stage, the gear means of the first gear stage being driven by said driving means, and the pinions of the gears means of the last gear stage engaging said rack at the opposite toothed portions thereof for moving said rack transversely of said reduction mechanism.

2. A rack drive comprising a single driving means, a rack having toothed portions on opposite sides thereof, a reduction mechanism comprising a plurality of rotatable gear means defining a plurality of gear stages arranged above said rack, said gear means being arranged into two parallel gear trains, one of the gear trains being above one toothed portion of the rack and the other gear train being above the other toothed portion of the rack, pinions mounted for rotation with each of the gear means, each of said pinions meshing with the gear means of the next succeeding gear stage, said reduction mechanism having a power input end at which one of said gear means engages with and is driven by said driving means, a second of said gear means drivably engaged by said one gear means, the pinion of said one gear means meshing with a gear means of one of said gear trains and the pinion of the second of said gear means engaging with a gear means of the second gear train, said reduction mechanism further having an output end at which the gear means of the last gear stage are driven by the pinions of the gear means of the preceding gear stage of each of said gear trains, and the pinions of the last-named gear means drivably engaging the opposite toothed portions of said rack for moving the latter transversely of said reduction mechanism.

3. A rack drive comprising a single driving means, a rack having toothed portions on opposite sides thereof, a reduction mechanism comprising a plurality of rotatable gears defining a plurality of gear stages arranged above said rack, said gears being arranged into two parallel gear trains, one of the gear trains being above one toothed portion of the rack and the other gear train being above the other toothed portion of the rack, pinions mounted for rotation with each of the gears, each of said pinions meshing with the gear of the next succeeding gear stage, said reduction mechanism having a power input end at which one of said gears engages with and is driven by said driving means, a second of said gears drivably engaged by said one gear, the pinion of said one gear meshing with a third of said gears contained in the first gear train and the pinion of the second of said gears meshing with a fourth gear contained in the second gear train, said reduction mechanism further having an output end at which the other of said gears are mounted below said rack and driven by the pinions of the gears of the preceding gear stage of each of said gear trains, and the pinions of said other gears drivably engaging the opposite toothed portions of said rack for moving the latter transversely of said reduction mechanism.

4. A rack drive comprising a single driving means, a rack having toothed portions on opposite sides thereof, a reduction mechanism comprising a plurality of rotatable gears defining a plurality of gear stages, pinions mounted for rotation with each of said gears, each of said pinions meshing with the gears of the next succeeding gear stage, said reduction mechanism having a power input end at which one of said gears engages with and is driven by said driving means, said reduction mechanism further having an output end at which other of said gears are driven by the pinions of the gears of the preceding gear stage, and the pinions of said other gears drivably engaging the opposite toothed portions of said rack for moving the latter transversely of said reduction mechanism.

5. A rack drive comprising a single driving means, a rack having toothed portions on opposite sides thereof, a reduction mechanism comprising a plurality of rotatable gears defining a plurality of gear stages arranged above said rack and a plurality of rotatable gears defining a plurality of gear stages arranged below said rack, pinions mounted for rotation with each of said gears, each of said pinions meshing with the gear of the next succeeding gear stage, said reduction mechanism having a power input end at which one of said gears above said rack and one of the gears below said rack are driven by said driving means, a power output end for said reduction mechanism comprising other of said gears above said rack driven by the pinions of the gears of the preceding gear stage and other of said gears below said rack driven by the pinions of the gears of the preceding gear stage, and the pinions of said other gears above and below said rack drivably engaging the opposite toothed portions of said rack for moving the latter transversely of said reduction mechanism.

WILLY LOHS.